United States Patent [19]
Fields

[11] Patent Number: 5,768,793
[45] Date of Patent: Jun. 23, 1998

[54] ADJUSTABLE TEMPLATE FOR LAYING TILES AND METHOD

[76] Inventor: Timothy S. Fields, 1740 Gibson Ave., Surfside Beach, S.C. 29575

[21] Appl. No.: 709,636

[22] Filed: Sep. 9, 1996

[51] Int. Cl.$^6$ .................................................. G01B 1/00
[52] U.S. Cl. ................................ 33/526; 33/527; 33/562; 52/387; 52/749.11
[58] Field of Search ............................ 33/526, 527, 613, 33/562, 44; 52/387, 392, 749.11, 747.11

[56] References Cited

U.S. PATENT DOCUMENTS

| | | |
|---|---|---|
| 1,108,775 | 8/1914 | Miles, Jr. ..................................... 33/44 |
| 2,466,919 | 4/1949 | Sykes ......................................... 33/526 |
| 3,744,141 | 7/1973 | Strickland, Sr. . |
| 3,745,735 | 7/1973 | Casano . |
| 3,775,856 | 12/1973 | Schmidt . |
| 3,988,187 | 10/1976 | Witt . |
| 4,233,792 | 11/1980 | Malavasi . |
| 4,311,464 | 1/1982 | Messina . |
| 4,342,154 | 8/1982 | Legrand ..................................... 33/562 |
| 4,583,343 | 4/1986 | Camp . |
| 4,744,194 | 5/1988 | Yasuyoshi . |
| 4,809,439 | 3/1989 | Burns ......................................... 33/527 |
| 4,827,625 | 5/1989 | LeMoal . |
| 5,181,326 | 1/1993 | Eberline .................................... 33/527 |
| 5,188,013 | 2/1993 | Cardinale . |
| 5,447,004 | 9/1995 | Vrnak . |
| 5,471,758 | 12/1995 | Whitel, Sr. ................................ 33/527 |

FOREIGN PATENT DOCUMENTS 2185115  7/1987  United Kingdom .................... 33/527

*Primary Examiner*—Daniel G. DePumpo
*Attorney, Agent, or Firm*—Ralph Bailey

[57] ABSTRACT

An adjustable template is illustrated having an elongated continuous guide (A) carrying a number of longitudinally spaced blocks (B) for accommodating floor tiles 25 of various widths, lengths and thicknesses. The blocks are manually adjustable on the longitudinal guides by adjustment of the threaded fasteners (C). The height of the legs (E) is vertically adjustable within receptacles (D) carried by a respective block on each side of the elongated guide (A). The method contemplates the laying of a single longitudinal row of tiles 30 while maintaining a next previously layed row of tiles 31 preparatory to laying and positioning of an additional row of tiles by movement of the apparatus across the previous longitudinal row of tiles.

11 Claims, 4 Drawing Sheets

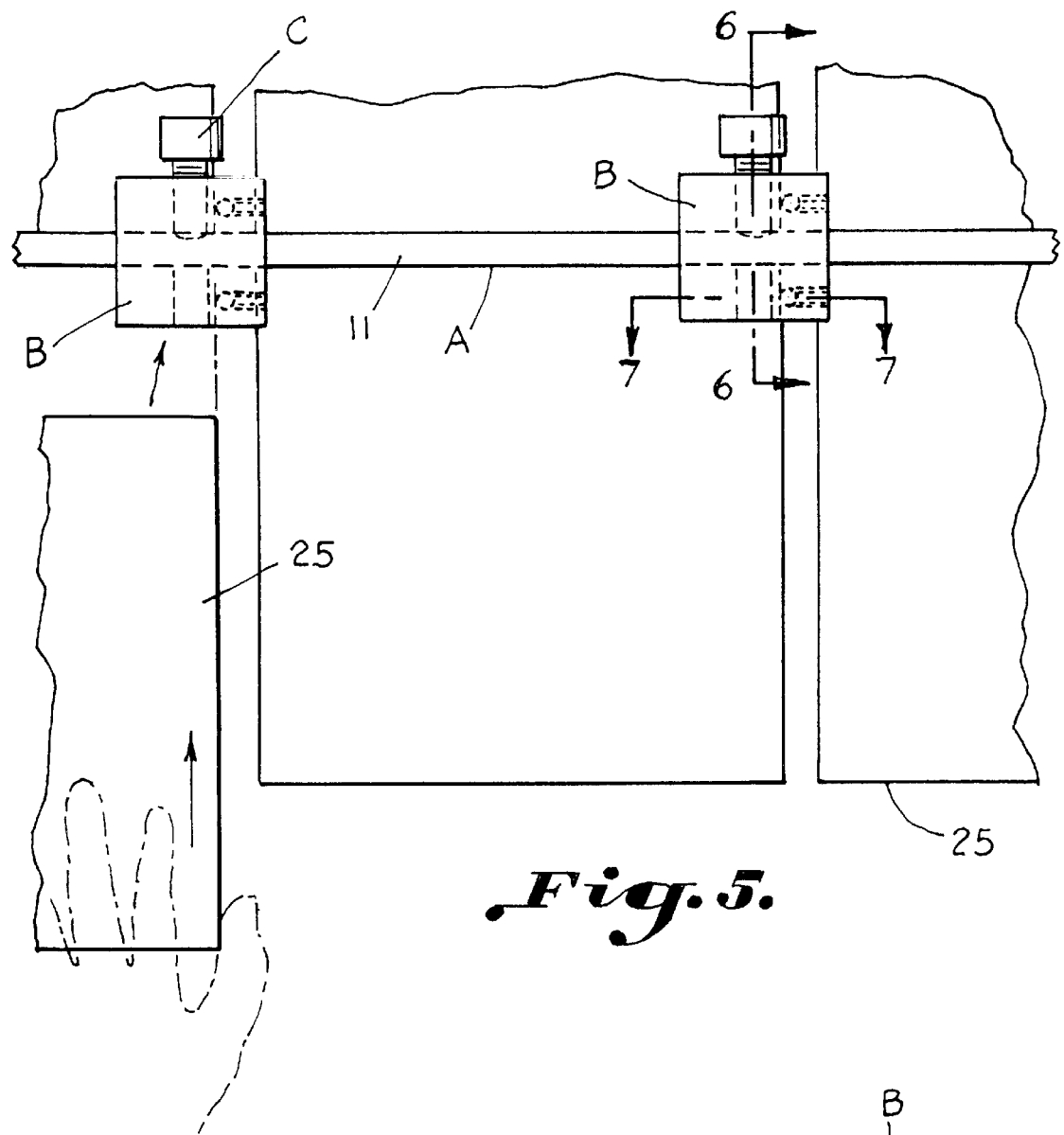
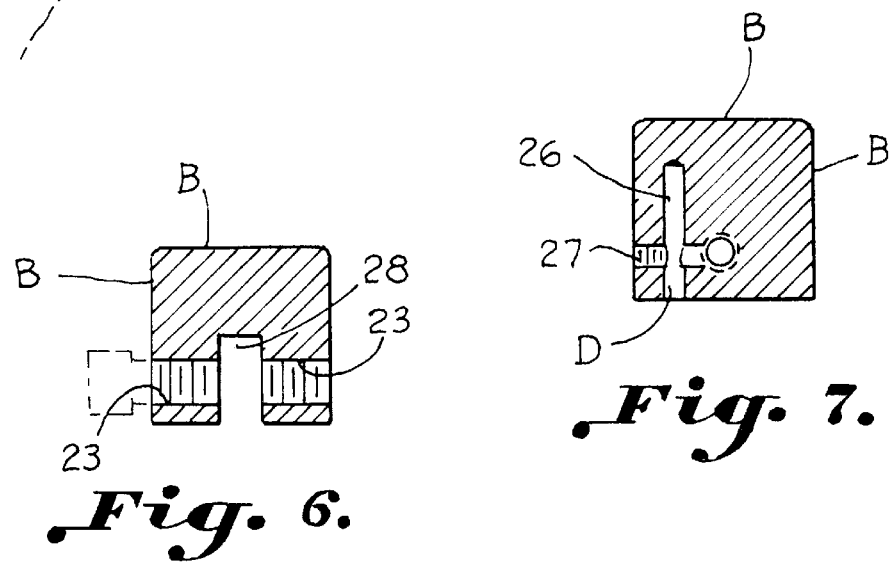

ADJUSTABLE TEMPLATE FOR LAYING TILES AND METHOD

BACKGROUND OF THE INVENTION

This invention relates to an improved apparatus and method for laying floor tiles for residential and industrial use.

The laying of floor tiles so as to be properly aligned in tile setting mud is a time consuming and arduous task requiring repeated steps of measuring and adjusting the position of tiles in longitudinal and transverse rows. Efforts have been made to facilitate tile laying both for professional and amateur tile layers. A commonly used tool for positioning tiles is a tile rack illustrated in U.S. Pat. No. 3,775,856. This patent illustrates the use of a grid forming a template having legs for supporting the grid above the tile setting mud on the floor for holding and positioning a number of floor tiles in respective grid sections. The use of such grids is itself a difficult task in that the grids are heavy requiring repeated moving and positioning adjustments as the tile laying operation progresses. Moreover, the tile racks are expensive and their use is time consuming requiring different sizes and patterning according to the tiles being layed. Thus, many tile racks would be required depending upon size, shape and patterns required.

Accordingly, it would be an important advantage if a simple tool or template could be provided to facilitate the laying of different sizes and patterns of floor tiles which could be easily handled and yet versatile enough to satisfy the requirements for most tile laying operations, and to simplify the manner in which tiles are aligned and adjusted.

The prior art is further exemplified by U.S. Pat. Nos. 3,744,141; 3,745,735; 3,988,187; 4,233,792; 4,311,464; 4,583,343; 4,744,194; 4,827,625; 5,188,013; and 5,447,004.

SUMMARY OF THE INVENTION

Accordingly, it is an important object of this invention to provide a desirable template and an improved method for laying floor tiles wherein an elongated guide is provided with adjustable gaging means for aligning rows of tiles in longitudinal and transverse directions preparatory to moving the template for laying a next succeeding row of tiles.

Another important object of the invention is to provide a template which is readily movable for laying one row of tiles at a time.

Another important object of the invention is the provision of a template and method for laying tiles wherein gaging means are provided for longitudinal adjustment to accommodate various sizes of tile wherein height adjustments may be readily made to accommodate tiles of various thicknesses.

Another important object of the invention is the provision of an adjustable template which will be lightweight and readily movable for laying the tiles providing for easy adjustments as to alignment and spacing of the tiles.

It has been found that an improved apparatus and method for laying floor tiles may be provided which is adjustable to accommodate various sizes and thickness of tiles utilizing an elongated member carrying slidable blocks thereon for adjusting both the longitudinal and transverse positioning of tiles while affording adjustable means for maintaining the device in adjustable height positions above the floor to accommodate tiles of various thicknesses and yet maintain the apparatus above the tile setting mud with which the floor is covered preparatory to laying tiles.

BRIEF DESCRIPTION OF THE DRAWINGS

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 5 is a top plan view illustrating the method of using the apparatus in connection with positioning a longitudinal row of tiles in relation to a previous next adjacent row of tile which is maintained in alignment therewith;

FIG. 6 is a transverse sectional elevation taken on the line 6—6 in FIG. 5 illustrating a threaded bore for positioning a threaded fastening for adjusting the longitudinal spacing of the gaging blocks on the elongated guide; and FIG. 7 is a longitudinal sectional elevation taken on the line 7—7 in FIG. 5 illustrating the positioning of vertical receptacles of sufficient depths to provide height adjustments for the transversely spaced legs illustrated as pins E.

DESCRIPTION OF A PREFERRED EMBODIMENT

Figure 1:
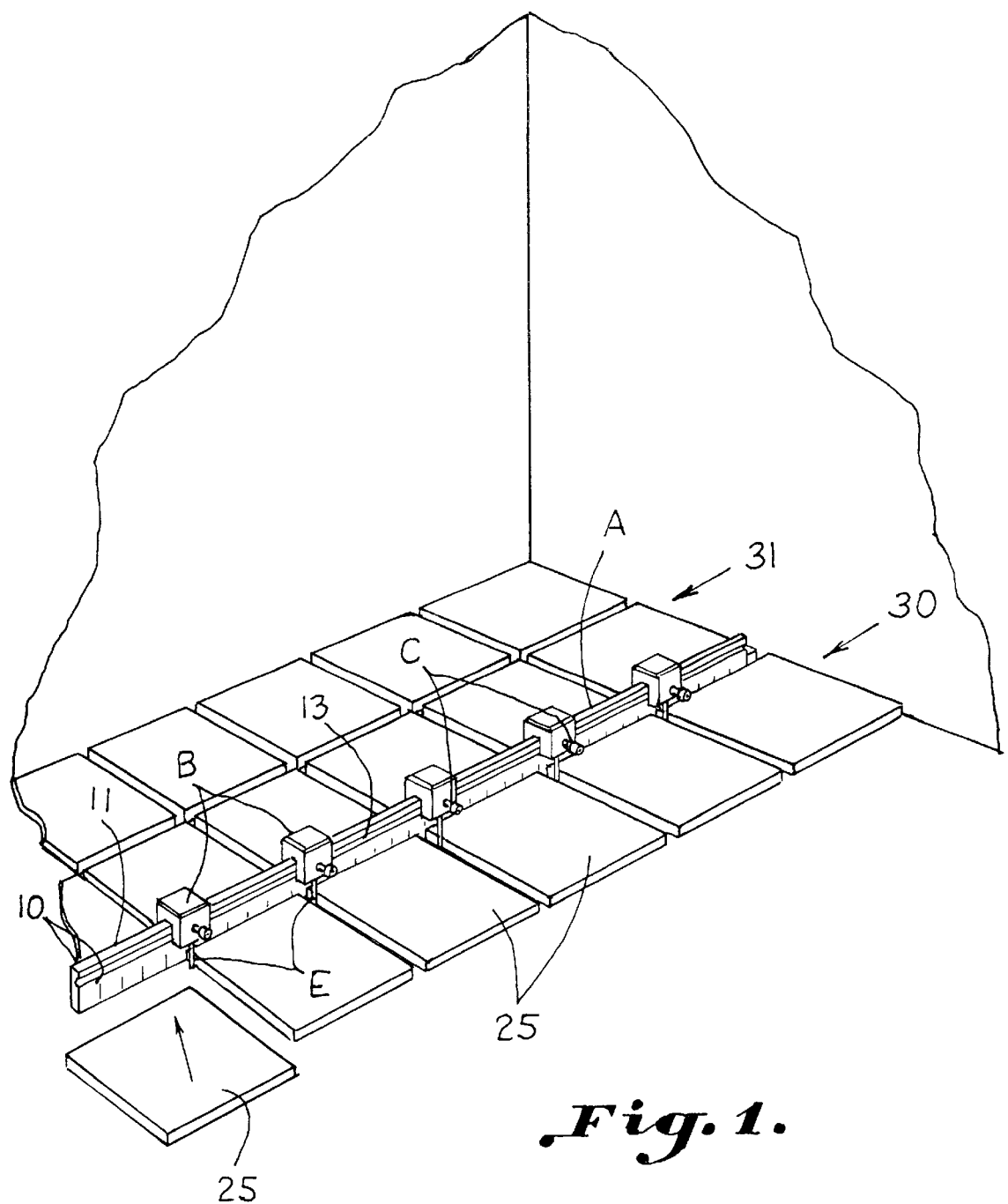
FIG. 1 is a perspective view illustrating an adjustable template constructed in accordance with the invention for carrying out the method of laying tiles in a longitudinal row preparatory to moving the template for maintaining the positioning of tiles of a previous row while accommodating the laying of a next succeeding row of tiles.

An adjustable template for laying floor tiles includes an elongated continuous guide A for extending across a plurality of floor tiles. A plurality of blocks B are provided for mounting in longitudinally spaced relation on the elongated continuous guide facilitating gauging and positioning of the floor tiles in aligned relation for setting on a floor. Adjustable fasteners C are provided on the blocks of generally rectangular cross section as illustrated for securing the blocks in desired longitudinally spaced relation to each other on the elongated continuous guide as governed by size dimensions in a horizontal plane of the tiles being layed. Transversely spaced receptacles D are positioned on the blocks on opposite sides of the elongated continuous guide. Legs E are insertable in the receptacles for supporting the elongated continuous guide in adjustable positions above the floor during a tile laying operation while gaging the longitudinal spacing of the tiles. Thus, tiles of various widths and lengths as well as thicknesses may be gauged and aligned by a single adjustable template.

Referring more particularly to FIGS. 1–5, it will be noted that the elongated continuous guide A is illustrated as having a narrow substantially rectangular cross section defined by closely adjacent sides 10 with top and bottom edges 11 and 12. A longitudinal groove 13 extends throughout the length of the elongated continuous guide A and provides for receiving an end of the adjustable fasteners C for fixing the adjustable blocks B in longitudinally spaced positions to accommodate tiles of various width dimensions. The blocks B have upper and lower surfaces 14 and 15 and end surfaces 16 and 17 defining a longitudinal channel 18 for accommodating an upper edge of an elongated continuous guide A for sliding adjustment thereon. The blocks B are adjustable in respect to graduations or indentations 19 and marked by indicia 20 as will be explained in greater detail below.

Figure 3:
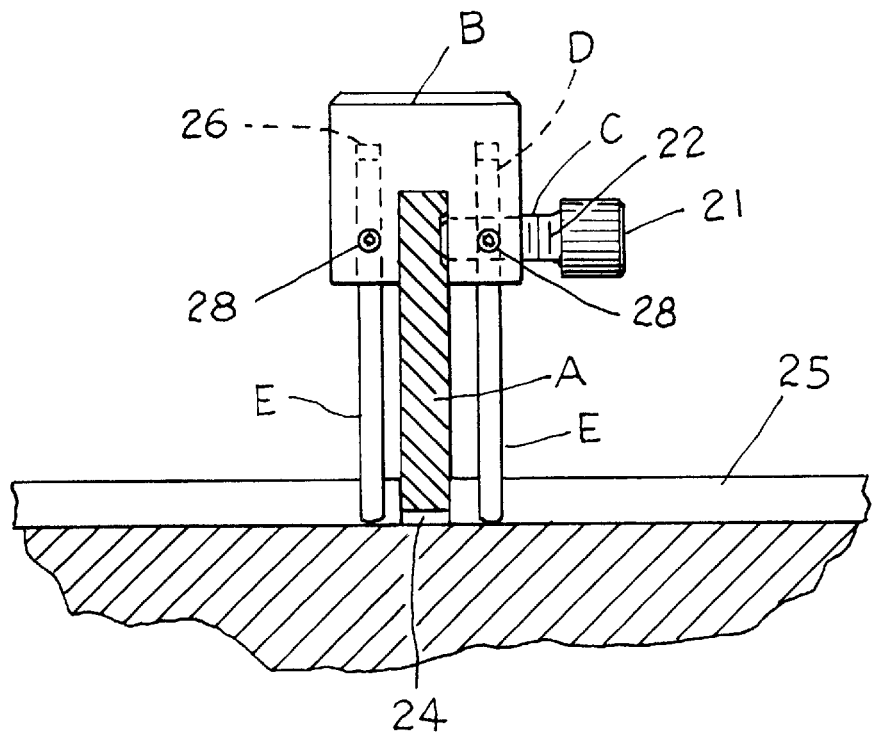
FIG. 3 is a transverse sectional elevation taken on the line 3—3 in FIG. 2 illustrating the positioning of the legs on either side of the elongated longitudinal guide for maintaining the apparatus at an adjustable height across the tiles.
Figure 4:
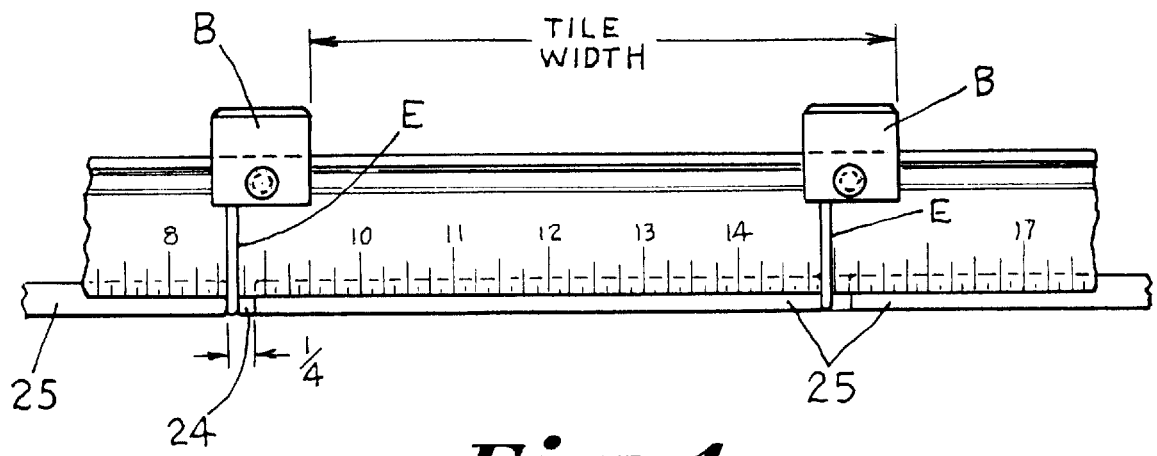
FIG. 4 is a longitudinal elevation illustrating a tile in its longitudinal positioning for spacing in relation to next adjacent tiles while held in abutting relation to the straight edge.

The adjustable fasteners C are each illustrated as including a knurled knob 21 for manually attaching the threaded shank 22 within the internally threaded bore 23 which extends transversely through the blocks B on both sides of the channel 18 as best illustrated in FIG. 6. If desired, the fastener C may be tightened for more permanent securement by using a wrench. By positioning the free ends of the threaded shanks within the groove 13, the blocks may remain confined on track during longitudinal adjustments following loosening of the adjustable fasteners C. Transverse spaced vertical receptacles D are best illustrated in FIG. 7 as being positioned within the blocks B on each side of the longitudinal channel 18 so as to possess sufficient depth to adjustably accommodate the legs E for vertical attachment. Thus, the height of the assembly of blocks B and guide A may be adjusted to maintain a desired height above the floor to provide tiles of varying thicknesses with contact on a longitudinal edge with the lower straight edge portion of the guide A, and to keep the apparatus out of contact with the tile setting mud as best illustrated in FIG. 3 wherein the tile setting mud is illustrated at 24.

Figure 2:
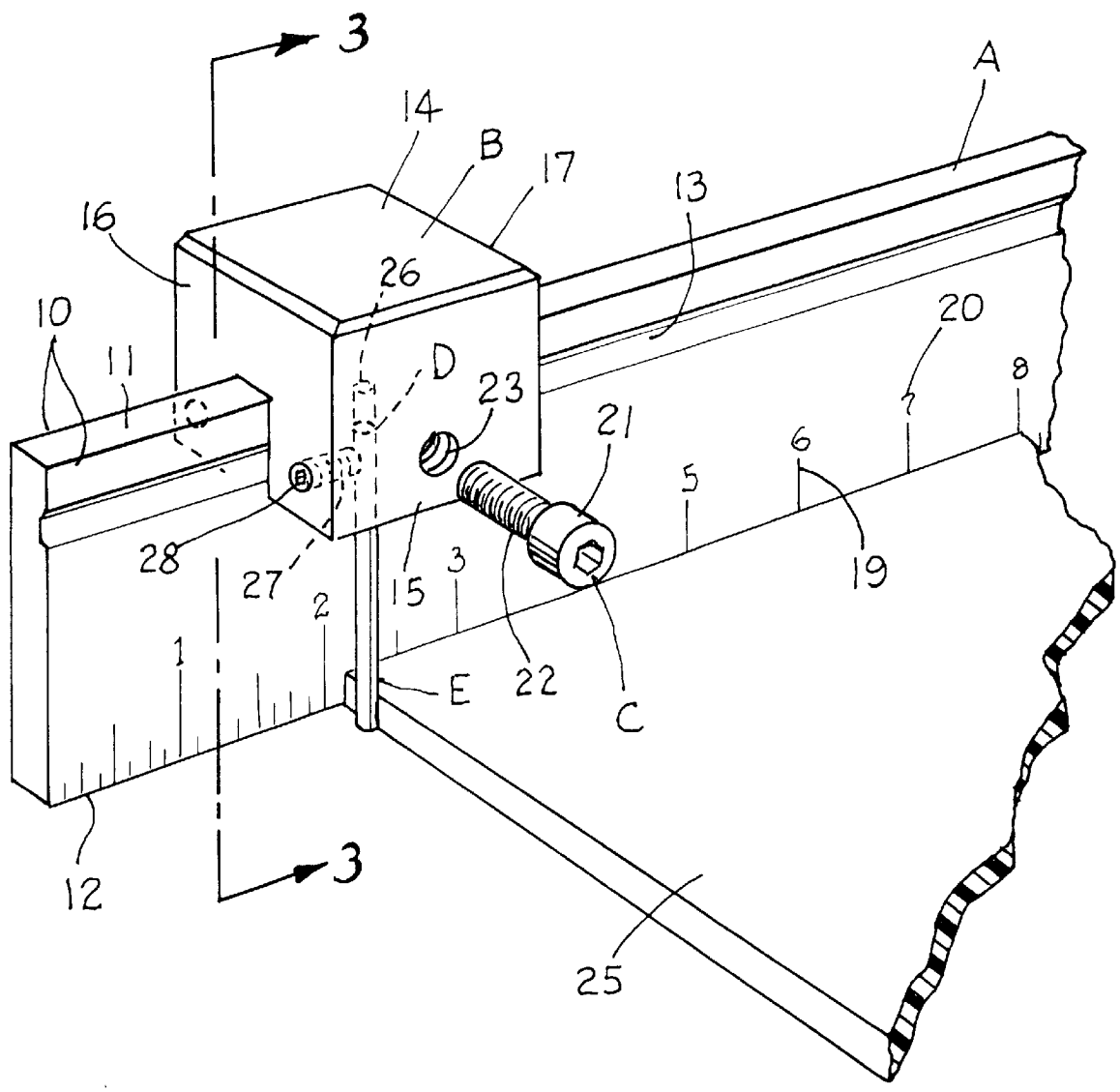
FIG. 2 is an enlarged perspective view further illustrating the apparatus of FIG. 1 wherein a tile is illustrated as abutting a longitudinal straight edge provided by an elongated longitudinal guide while spacing is maintained by abutting a side of the tile against a vertical gaging member such as a support leg which also serves to maintain the apparatus above the tile setting mud.

Thus, a low straight edge portion of the elongated continuous guide A is maintained out of contact with the tile setting mud and yet sufficiently close to the floor to maintain engagement with the floor tiles 25 to permit one edge of the tiles to be abutted thereagainst to establish longitudinal alignment of the tiles in the various rows. The receptacles D are preferably formed by vertical bores adjacent the end surface 16 so as to provide an excess in length as illustrated at 26 in FIG. 2 to permit the vertical adjustment. A horizontal threaded bore is provided at 27 to permit the placement of a fastening means for securing the legs E in a vertical adjusted position in the form of a set screw 28. The legs E may assume any desired configuration but preferably are in the form of circular pins to facilitate adjustment and alignment with the graduations 19 in the elongated guide A as described above. As illustrated in FIG. 1, the apparatus may be easily moved from a completed row broadly designated at 31 to a next adjacent row 30 while maintaining cross alignment of the tiles. The receptacles D may be positioned adjacent a trailing edge of the block B as best shown in FIG. 2 or by reversing the block on the guide the receptacle may be adjacent a forward end of blocks. This provides even more versatility in longitudinal spacing.

It is thus seen that a simple, easily moved template or gauge has been provided for readily positioning and maintaining one row of tile laying at a time. The template provides for versatile longitudinal and transverse adjustments as well as accommodating tiles of various sizes and thicknesses. Preferably, the guides and blocks are constructed of extended aluminum so as to be light, versatile and inexpensive.

While a preferred embodiment of the invention has been described using specific terms, such description is for illustrative purposes only, and it is to be understood that changes and variations may be made without departing from the spirit or scope of the following claims.

What is claimed is:

1. An adjustable template for laying tiles comprising:

an elongated continuous guide for extending across a plurality of tiles;

a plurality of blocks for mounting in longitudinally spaced relation on said elongated continuous guide for gauging and positioning the tiles in relation for setting;

adjustable fasteners on said blocks for securing the blocks in desired longitudinally spaced relation to each other on said elongated continuous guide as governed by a size dimension of the tiles being layed;

transversely spaced vertical receptacles on said blocks on opposite sides of said elongated continuous guide; and legs insertable in said receptacles for supporting said elongated continuous guide during a tile laying operation;

whereby tiles of various sizes may be gauged by a single adjustable template.

2. The structure set forth in claim 1 wherein said elongated guide has a rectangular cross section of narrow width in relation to height.

3. The structure set forth in claim 2 including a plurality of graduations on said guide to facilitate spacing of said blocks.

4. The structure set forth in claim 1 including a longitudinal groove on said guide for reception of said adjustable fasteners facilitating retention of the blocks for slidable adjustment on said guide.

5. The structure set forth in claim 1 wherein a lower edge of said guide serves as a continuous straight edge for receiving a plurality of tiles in longitudinally spaced abutting relation.

6. The structure set forth in claim 1 wherein said blocks are of generally rectangular cross section.

7. The structure set forth in claim 6 wherein said blocks have a longitudinal channel in a lower portion for straddling the elongated guide for slidable adjustment thereon.

8. The structure set forth in claim 7 including a transverse threaded bore in said blocks for threadably receiving said fastener.

9. The structure set forth in claim 8 wherein said receptacles accommodate height adjustments of said legs.

10. The structure set forth in claim 9 wherein said legs are pins of circular cross section.

11. A method for laying tiles comprising the steps of:

positioning an elongated continuous guide member across a plurality of tiles;

providing a plurality of blocks for support in longitudinally spaced relation on said elongated continuous guide for gauging and positioning the tiles in relation for setting;

positioning the blocks on the guide members for securing the blocks in desired longitudinally spaced relation to each other on the elongated continuous guide as governed by a size dimension of the tiles being layed;

providing transversely spaced receptacles on said blocks on opposite sides of said elongated continuous guide; and inserting legs vertically in said receptacles for supporting said elongated continuous guide above during a tile laying operation;

whereby tiles of various sizes may be gauged by a single adjustable template.

* * * * *